United States Patent [19]

Fujikawa

[11] 4,346,685
[45] Aug. 31, 1982

[54] INTERNAL COMBUSTION ENGINE WITH GAS SEALING DEVICE

[75] Inventor: Tetsuzo Fujikawa, Kobe, Japan

[73] Assignee: Kawasaki Jukogyo Kabushiki Kaisha, Hyogo, Japan

[21] Appl. No.: 110,301

[22] Filed: Jan. 8, 1980

[30] Foreign Application Priority Data

Jan. 23, 1979 [JP] Japan .................... 54-7317[U]

[51] Int. Cl.³ .............. F02F 3/24; F16J 9/02; F16J 9/08
[52] U.S. Cl. .................. 123/193 P; 92/182; 277/170; 277/171
[58] Field of Search ............... 92/182; 277/170, 171; 123/193 P

[56] References Cited

U.S. PATENT DOCUMENTS

| | | | |
|---|---|---|---|
| 3,542,376 | 11/1970 | Dykehouse | 277/212 C |
| 3,554,564 | 1/1971 | Lassanske | 277/170 |
| 3,704,893 | 12/1972 | Hill | 277/171 |
| 3,834,719 | 9/1974 | Shin et al. | 92/182 X |
| 4,106,463 | 8/1978 | Curtis, Jr. | 92/182 X |
| 4,123,072 | 10/1978 | Sharpe | 277/171 X |

FOREIGN PATENT DOCUMENTS

| | | | |
|---|---|---|---|
| 760900 | 12/1953 | Fed. Rep. of Germany | 277/170 |
| 636286 | 4/1950 | United Kingdom | 277/171 |

Primary Examiner—Irwin C. Cohen
Attorney, Agent, or Firm—Jordan and Hamburg

[57] ABSTRACT

An internal combustion engine having a gas sealing device including an L-shaped keystone piston ring groove formed on the outer circumferential surface of a piston, and an L-shaped keystone piston ring in pressing contact with the inner surface of a cylinder and fitted in the L-shaped keystone piston ring groove forming a gap for introducing a gas pressure from a combustion chamber into the piston ring groove. The L-shaped keystone piston ring groove includes an outer groove portion underlying a top land formed in the piston, and a wedge-shaped groove portion contiguous with the outer groove portion and tapering in going toward the center axis of the piston. The L-shaped keystone piston ring includes an outer ring portion disposed in the outer groove portion of the piston ring, and a wedge-shaped ring portion disposed in the wedge-shaped groove portion of the piston ring groove. The top land has a smaller diameter than a second land formed in the piston adjacent the piston ring groove on a side thereof opposite the top land, so that a gap is formed between the top land and the inner surface of the cylinder to communicate with the gap for introducing the gas pressure from the combustion chamber into the piston ring groove.

1 Claim, 8 Drawing Figures

INTERNAL COMBUSTION ENGINE WITH GAS SEALING DEVICE

BACKGROUND OF THE INVENTION

This invention relates to internal combustion engines, and more particularly it is concerned with a gas sealing device for providing a gas seal between the cylinder and the piston of an internal combustion engine.

An internal combustion engine is known which comprises a cylinder, a piston arranged in the cylinder for reciprocatory movement, and a gas sealing device for providing a gas seal between the piston and the inner surface of the cylinder, wherein a combustion chamber is defined between the cylinder and the top surface of the piston and wherein the gas sealing device includes a piston ring fitted in a piston ring groove formed on the outer circumferential surface of the piston. The gas sealing device used in this type of internal combustion engine has hitherto been available in a variety of known forms. Gas sealing devices of the prior art have had the disadvantages that the portion of the piston disposed above the top piston ring groove for receiving the piston ring therein is reduced in strength, that no positive sealing function is obtainable, that seizing occurs at the interface between the piston ring and the piston ring groove, and that the power of the internal combustion engine is reduced.

FIGS. 1-3 show examples of internal combustion engines provided with gas sealing devices of the type described of the prior art. In order that the aforesaid disadvantages of the prior art may be fully understood, the gas sealing devices shown in FIGS. 1-3 will be described hereinafter.

FIG. 1 shows an internal combustion engine comprising a cylinder 1, a piston 2 arranged in the cylinder 1 for reciprocatory movement vertically in the figure, and a gas sealing device for providing a gas seal between the piston 2 and an inner surface 7 of the cylinder 1. The cylinder 1 and the piston 2 define therebetween a combustion chamber 3, and the gas sealing device includes a piston ring 4 fitted in a piston ring groove 5 formed on a circumferential surface of the piston 2. The piston ring 4 shown in FIG. 1 is substantially in the form of a letter L in cross-sectional shape and includes an outer circumferential surface 6 maintained in pressing contact with the inner surface 7 of the cylinder 1. The piston ring groove 5 opens in the combustion chamber 3 and consequently a top surface 8 of the L-shaped piston ring 4 is exposed in the combustion chamber 3. A gap 9 is formed between surfaces of the piston ring groove 5 and the piston ring 4. When the internal combustion engine is in operation, the pressure of gas from the combustion chamber 3 applied to inner circumferential surfaces 10 and 10' of the piston ring 4 urges the piston ring 4 to move radially thereof, to thereby force the outer circumferential surface 6 of the piston ring 4 against the inner surface 7 of the cylinder 1. If the pressure of gas is high, then the piston ring 4 is forced against the inner surface 7 of the cylinder 1 with a relatively high force; and if the pressure of gas is low, then the piston ring 4 is forced against the inner surface of the cylinder 1 with a relatively low force. That is, when the pressure of gas is high and consequently a high sealing ability is required, the piston ring 4 is pressed against the inner surface 7 of the cylinder 1 with a high force due to the high gas pressure, to provide a desired high degree of seal. The gas sealing device shown in FIG. 1 is capable of controlling the force with which the piston ring 4 is forced against the inner surface 7 of the cylinder 1 in accordance with the pressure of gas in the combustion chamber 3, so that the force with which the piston ring 4 presses against the inner surface 7 of the cylinder 1 can be reduced when the internal combustion engine is inoperative, to thereby minimize a friction loss between the piston ring 4 and the inner surface 7 of the cylinder 1. By virtue of this feature, the constructional form shown in FIG. 1 has particular utility in application to a two-cycle engine of high speed and high power.

However, the internal combustion engine shown in FIG. 1 has the disadvantage that with the top surface 8 of the piston ring 4 exposed in the combustion chamber 3, a peripheral portion 11 of the piston 2 overlying the piston ring groove 5 has a small thickness t extending axially of the piston 2 and consequently the strength of the peripheral portion 11 is reduced. A portion of the peripheral portion 11 disposed on the exhaust port (not shown) side is exposed to high temperatures and liable to be damaged.

To cope with this situation, a proposal has been made to form the piston ring groove 5a in a position remote from a top surface 12a of the piston 2a to provide a top land 13a between the top surface 12a and piston ring groove 5a as shown in FIG. 2, so as to increase the thickness of the peripheral portion 11a of the piston 2 overlying the piston ring groove 5a. By this arrangement, the thickness of the peripheral portion 11a of the piston 2a is increased and the strength of the peripheral portion 11a is increased. However, in this construction, the pressure of gas produced in the combustion chamber 3a does not act readily on the inner circumferential surfaces 10a and 10a' of the piston ring 4a of the L-shape, with a result that the gas sealing action relying on the pressure of gas of combustion characteristic of an L-shaped piston ring is prevented from achieving satisfactory results and the power of the engine tends to show a reduction. Also, with a reduction in the pressure of gas acting on the L-shaped piston ring 4a, the radial movement of the L-shaped piston ring 4a is reduced in intensity. Combined with a reduced radial movement of the piston ring 4a, a reduction in the temperature in the piston ring groove 5a below the temperature in the piston ring groove 5 shown in FIG. 1 increases the possibility of occurrence of seizing in the interface between the piston ring 4a and the piston ring groove 5a due to the deposition of carbon in the annular groove 5a.

To avoid the occurrence of seizing in the interface between the piston ring 4a and the piston ring groove 5a, a proposal has been made to form, as shown in FIG. 3, a keystone piston ring groove 5b on the outer circumferential surface of the piston 2b in a position corresponding to that of the piston ring groove 5a shown in FIG. 2 and to fit an ordinary keystone ring 4b in the keystone piston ring groove 5b, so as to provide a gas seal to the cylinder 1b and piston 2b. In this construction, it is necessary to increase the force urging the piston ring 4b against the cylinder 1b when the engine is inoperative, so that the friction between the outer circumferential surface 6b of the piston ring 4b and the inner surface 7b of the cylinder 1 is increased and the power of the engine is reduced.

SUMMARY OF THE INVENTION

This invention obviates the aforementioned disadvantages of the prior art. Accordingly, the invention has as its object the provision of an internal combustion engine provided with a gas sealing device which does not reduce the strength of the peripheral portion of the piston overlying the piston ring groove and does not cause seizing at the interface between the piston ring and the piston ring groove and a reduction in the power of the engine while making it possible to control the force with which the piston ring presses against the inner surface of the cylinder by the pressure of gas produced in the combustion chamber by making the most of the advantages of the L-shaped piston ring.

According to the invention, there is provided an internal combustion engine comprising a cylinder, a piston arranged for reciprocatory movement in said cylinder, a gas sealing device for providing a gas seal between an outer circumferential surface of said piston and an inner surface of said cylinder comprising a piston ring and a piston ring groove formed in the outer circumferential surface of said piston for fitting said piston ring therein, and a combustion chamber defined by a top surface of said piston and the inner surface of said cylinder, wherein the improvement resides in that said piston ring groove is in the form of an L-shaped keystone piston ring groove including an annular outer groove portion disposed in the radially outward portion of the L-shaped keystone piston ring groove and parallel to the center axis of said piston, and an annular wedge-shaped groove portion contiguous with said outer groove portion to extend toward the center axis of said piston in such a manner that said annular wedge-shaped groove portion is tapered toward the center axis of said piston as viewed in a vertical section of the piston, that said piston ring is in the form of an L-shaped keystone piston ring including an annular outer ring portion disposed in said outer groove portion of said piston ring groove and extending parallel to the center axis of said piston, and an annular wedge-shaped ring portion disposed in said wedge-shaped groove portion of said piston ring groove and tapered toward the center axis of said piston as viewed in a vertical section of said piston, said annular outer ring portion of said L-shaped keystone piston ring being maintained at its outer circumferential surface in sliding contact with the inner surface of said cylinder, that a gap is defined between said L-shaped keystone piston ring and said L-shaped keystone piston ring groove, and that said piston ring groove is formed on the outer circumferential surface of said piston in a position remote from the top surface of said piston defining said combustion chamber to form a top land in a peripheral portion of said piston having a substantial thickness extending in the direction of the center axis of said piston, said top land having a diameter smaller than that of a second land formed on the outer circumferential surface of said piston adjacent said piston ring groove on a side thereof opposite said combustion chamber so that a gap is formed between an outer circumferential surface of said top land and the inner surface of said cylinder to allow a gas pressure to be introduced from said combustion chamber into said gap defined between said L-shaped keystone piston ring and said L-shaped keystone piston ring groove.

According to this arrangement, the L-shaped keystone piston ring and the L-shaped keystone piston ring groove enable deposition of carbon on the piston ring groove and seizing at the interface between the piston ring and piston ring groove to be avoided in spite of the face that the piston ring groove is remote from the combustion chamber.

DESCRIPTION OF THE PREFERRED EMBODIMENTS

Figure 4:
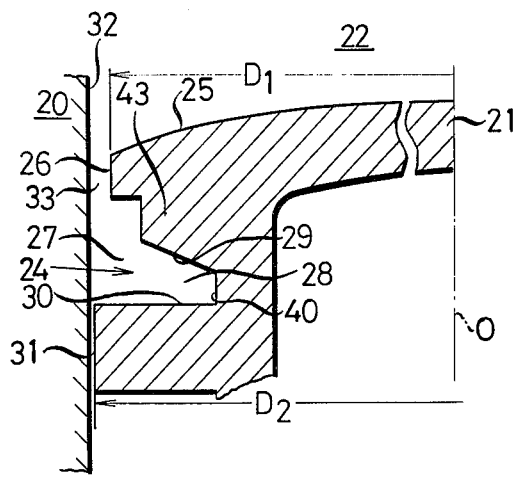
FIG. 4 is a fragmentary sectional view of one embodiment of the internal combustion engine in conformity with the invention, shown along the center axis of the piston and with the piston ring being removed to clearly show the L-shaped keystone piston ring groove formed on the outer circumferential surface of the piston.
Figure 5:
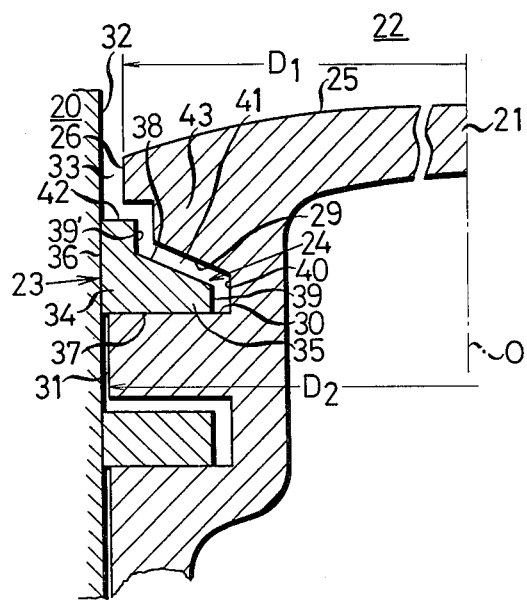
FIG. 5 is a sectional view similar to FIG. 4 but showing the piston ring in the form of an L-shaped keystone ring fitted in the L-shaped keystone piston ring groove shown in FIG. 4.

FIGS. 4 and 5 show one embodiment of the invention wherein the internal combustion engine comprises a cylinder 20, a piston 21 arranged in the cylinder 20 for reciprocatory movement therein, and a gas sealing device for providing a gas seal between the piston 21 and an inner surface 32 of the cylinder 20. The piston 21 and cylinder 20 define a combustion chamber 22. As shown in FIG. 5, the piston ring of the gas sealing device is in the form of an L-shaped keystone ring 23 having a substantially L-shaped cross-sectional shape which is fitted in an L-shaped keystone piston ring groove 24 of a substantially L-shaped cross-sectional shape formed on the outer circumferential surface of the piston 21.

As is clearly seen in FIG. 4, the L-shaped keystone piston ring groove 24 is formed in a position on the outer circumferential surface of the piston 21 which is remote from a top surface 25 of the piston 21, to form a top land 26 between the piston ring groove 24 and the top surface 25 of the piston 21. As seen in a vertical section extending along the center axis O of the piston 21, the L-shaped keystone piston ring groove 24 includes an outer groove portion 27 disposed parallel to the center axis O, and a wedge-shaped groove portion 28 extending from the outer groove portion 27 toward the center axis O in a manner to taper toward the center axis O. The two groove portions 27 and 28 are substantially in the form of a letter L when they are combined. In the embodiment shown in FIGS. 4 and 5, an upper wall surface 29 of the wedge-shaped groove portion 28 is inclined with respect to a transverse sectional plane (or horizontal in the figures) of the piston 21, and a lower wall surface 30 thereof extends parallel to the transverse sectional plane (or horizontal in the figures) of the piston 21. The top land 26 has a diameter $D_1$ which is smaller than the outer diameter $D_2$ of a portion of the piston 21 underlying the L-shaped keystone piston ring groove 24 or a second land 31, so that an annular gap 33 is defined between the outer circumferential surface of the top land 26 and the inner surface 32 of the cylinder 20 and has a size large enough to introduce gas from the combustion chamber 22 into the piston ring groove 24.

Referring to FIG. 5, the L-shaped keystone piston ring 23 includes, as seen in a vertical section extending along the center axis O of the piston 21, an outer ring portion 34 slightly smaller than the outer groove portion 27 of the piston ring groove 24 in dimensions, and a wedge-shaped ring portion 35 extending from the outer ring portion 34 toward the center axis O of the piston 21 in a manner to taper toward the center axis O. The piston ring 23 is formed in one piece, and its wedge-shaped ring portion 35 is smaller in dimensions than the wedge-shaped groove portion 28 of the piston ring groove 24.

Figure 1:
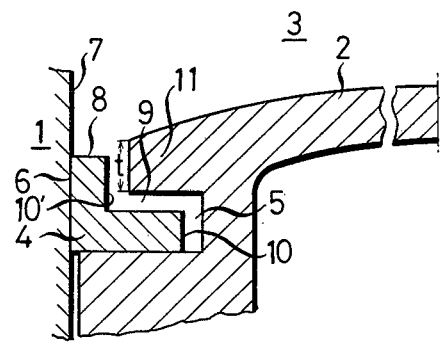
FIGS. 1–3 are fragmentary sectional views along the center axis of the piston of internal combustion engines of the prior art.
Figure 2:
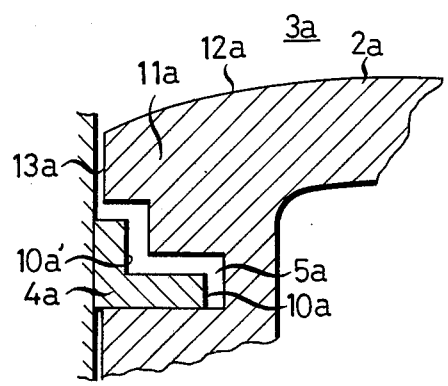

THe piston ring 23 presses at an outer circumferential surface 36 thereof against the inner surface 32 of the cylinder 20. Like the L-shaped piston ring 4 shown in FIG. 1, the piston ring 23 is designed such that the force with which the piston ring 23 is urged against the inner surface 32 of the cylinder 20 is relatively low when the engine is inoperative. The piston ring 23 has a bottom surface 37 in contact with the lower wall surface 38 of the piston ring groove 24, and an upper surface 38 and an inner circumferential surface 39 of the wedge-shaped ring portion 35 are disposed in spaced juxtaposed relation to the upper wall surface 29 and a lateral surface 40 respectively of the wedge-shaped groove portion 28 of the piston ring groove 24, to define a gap 41 between the piston ring 23 and the piston ring groove 24. The gap 41 is maintained in communication with the combustion chamber 22 through the gap 33 formed between the top land 26 and the inner surface 32 of the cylinder 20.

When the engine is in operation, the piston 21 is moved in reciprocatory movement in the cylinder 20 by the pressure of gas produced by the combustion of a fuel-air mixture in the combustion chamber 22, and the outer circumferential surface 36 of the piston ring 23 is brought into sliding contact with the inner surface 32 of the cylinder 20. The gas under pressure is introduced from the combustion chamber 22 through the gap 33 to the gap 41 where the pressure of gas acts on the inner circumferential surfaces 39 and 39' of the piston ring 23 to urge the piston ring 23 to move radially thereof. Thus the force with which the piston ring 23 presses at its outer circumferential surface 36 against the inner surface 32 of the cylinder 20 is increased. In this way, a higher pressure of gas is applied to the piston ring 23 when the pressure of gas in the combustion chamber 22 is high to provide a higher degree of seal between the outer circumferential surface 36 of the piston ring 23 and the inner surface 32 of the cylinder 20, and the pressure applied to the piston ring 23 is reduced as the pressure of gas in the combustion chamber 22 drops so that the force with which the outer circumferential surface 36 of the piston ring 23 presses against the inner surface 32 of the cylinder 20 is reduced, as is the case with the L-shaped piston ring 4 shown in FIG. 1. Thus the gas sealing device according to the invention permits a necessary degree of seal to be provided between the piston ring 23 and the cylinder 20 as the pressure of gas in the combustion chamber 22 rises and falls, so that it is possible to automatically control the force with which the piston ring 23 presses against the cylinder 20 in accordance with the pressure of gas in the combustion chamber 22.

Figure 3:
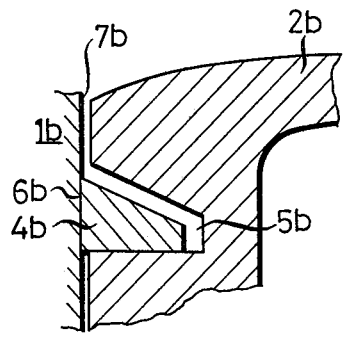

In the constructional form shown in FIGS. 4 and 5, the piston ring groove 24 is disposed in a position remote from the top surface 25 of the piston 21 to allow the top land 26 to be formed in the upper portion of the piston 21. Thus a top surface 42 of the L-shaped keystone piston ring 23 is not exposed in the combustion chamber 22, and it is possible to give a large thickness to a peripheral portion 43 of the piston 21 overlying the piston ring groove 24. Thus the peripheral portion 43 of the piston 23 shaped like a ledge in its cross-sectional shape can have increased strength and is free from the damage that might otherwise be caused to a portion thereof disposed on the exhaust port (not shown) side to which a high thermal load is applied. In addition to the advantages offered by the invention as described hereinabove, the gap 33 of relatively large size formed between the outer circumferential surface of the top land 26 and the inner surface 32 of the cylinder 20 enables a suitable quantity of gas under pressure to be introduced from the combustion chamber 22 into the L-shaped keystone piston ring groove 24 to apply a sufficiently high gas pressure to the inner circumferential surfaces 39 and 39' of the L-shaped keystone piston ring 23 to make it possible to control as desired the pressing contact of the outer circumferential surface 36 of the piston ring 23 with the inner surface 32 of the cylinder 20 as described hereinabove. Also, the provision of the top land 26 having the thickness extending in the axial direction of the piston 21 may be considered to cause a reduction in the temperature in the piston ring groove 24 and increased deposition of carbon therein because of the increased distance between the piston ring groove 24 and the combustion chamber 22. However, since the L-shaped keystone piston ring 23 has the wedge-shaped ring portion 35, the wedge-shaped ring portion 35 cooperates with the wedge-shaped groove portion 28 of the piston ring groove 24 to prevent accumulation of carbon in the groove 24 as in the gas sealing device of the prior art having a known keystone piston ring shown in FIG. 3. The piston ring 23 moves radially thereof as the gas pressure applied to its inner circumferential surfaces 39 and 39' repeatedly fluctuates in magnitude, and consequently wedge-shaped ring portion 35 of the piston ring 23 moves relative to the wedge-shaped groove portion 28 of the keystone piston ring groove 24, so that the carbon which would otherwise be deposited in the groove 24 can be destroyed by the wedging action of the wedge-shaped ring portion 35 of the piston ring 23, thereby positively avoiding seizing at the interface between the piston ring 23 and the piston 21. The constructional form shown in FIG. 5 is suitable for providing a sealing function for a two-cycle internal combustion engine of high power.

Figure 6:
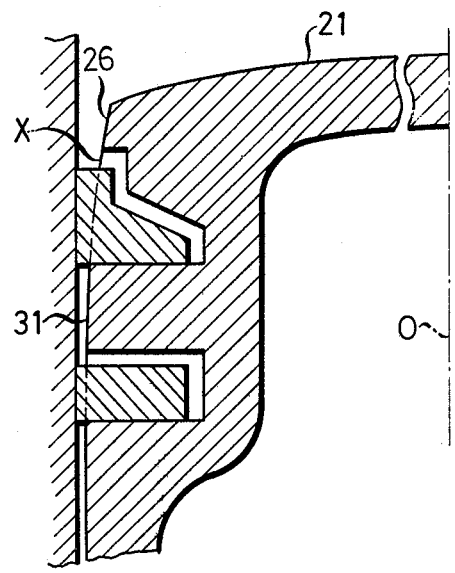
FIG. 6 is a fragmentary sectional view similar to FIG. 5 but showing another embodiment of the invention.

It is to be understood that the invention is not limited to the specific constructional form shown in FIG. 5 and that many changes and modifications may be made therein within the scope of the invention. For example, as shown in FIG. 6, the outer circumferential surface of the top land 26 having a smaller diameter than the second land 31 may be curved upwardly toward the center axis O of the piston 21. A curve shown in FIG. 6 in a dash-and-dot line is an imaginary line drawn to enable the curving of the outer circumferential surface of the top land 26 to be better understood.

Figure 7:
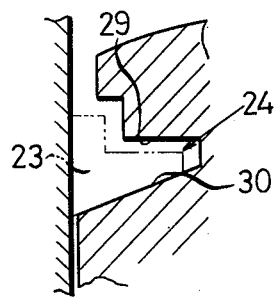
FIGS. 7 and 8 are fragmentary sectional views of other forms of L-shaped keystone piston ring groove of the gas sealing device according to the invention.

FIG. 7 shows another modification of the gas sealing device wherein the upper wall surface 29 of the L-shaped keystone piston ring groove 24 is horizontal and the piston ring groove 24 has a slanted lower wall surface 30. The L-shaped keystone piston ring 23 is shaped to conform to the surfaces of the piston ring groove 24.

Figure 8:
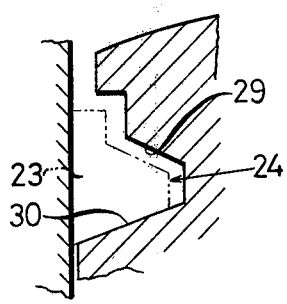

In FIG. 8, the L-shaped keystone piston ring groove 24 has the upper and lower wall surfaces 29 and 30 which are both slanted, and the L-shaped keystone piston ring 23 is shaped to conform to the surfaces of the piston ring groove 24.

The embodiments shown in FIGS. 6–8 are similar to the embodiment shown in FIG. 5 in construction except for the differences described hereinabove and offer the same advantages as the embodiment shown in FIG. 5.

What is claimed is:

1. An internal combustion engine comprising
    a cylinder,
    a piston for reciprocating movement arranged in said cylinder,
    a combustion chamber defined by a top surface of said piston and an inner surface of said cylinder,
    a device for providing a gas seal between an outer circumferential surface of said piston and said inner surface of said cylinder, which comprises,
        a piston ring, and
        a piston ring groove formed in said outer circumferential surface of said piston for fitting said piston ring therein, in which
        said piston ring groove is in the shape of an L-shaped keystone, including
            an annular outer portion disposed radially outwardly of said piston and parallel to the center axis of said piston, and
            an annular wedged-shaped portion contiguous with said annular outer portion, extending toward the center axis of said piston and tapered toward the center axis of said piston when viewed in a vertical section,
        said piston ring groove formed in a position in the outer circumferential surface of said piston that is remote from the top surface of said piston to form a top land in a peripheral portion of said piston, of substantial thickness extending in the direction of the center axis of said piston,
        said piston ring is in the shape of an L-shaped keystone, including
            an annular outer ring portion disposed in said outer groove portion of said piston ring groove, extending parallel to the center axis of said piston, and
            an annular wedge-shaped ring portion disposed in said wedge-shaped groove portion of said piston ring groove, tapering toward the center of axis of said piston when viewed in a vertical section, said annular wedge-shaped ring portion maintained in sliding contact at its outer circumferential surface with the inner surface of said cylinder,
    with a gap defined between said L-shaped keystone piston ring and said L-shaped keystone piston ring groove, in which said top land has a diameter smaller than a diameter of a bottom land formed on the outer circumferential surface of said piston on a side of said piston ring groove opposite said top land, forming a gap between an outer circumferential surface of said top land and the inner surface of said cylinder, the diameter of said top land gradually expanding in the direction toward said piston ring groove away from said combustion chamber, said top land partially overlying said piston ring, and the outer circumferential surface of said top land curves inwardly from a maximum diameter at the edge of said piston ring groove toward the center axis of said piston in the direction toward said combustion chamber away from said piston ring groove, to allow gas pressure to be introduced from said combustion chamber into the gap defined between said L-shaped keystone piston ring and said L-shaped keystone piston ring groove.

* * * * *